United States Patent [19]

Mohr et al.

[11] Patent Number: 4,754,113
[45] Date of Patent: Jun. 28, 1988

[54] INDUCTION COIL HEATING UNIT FOR HEAT SEALING CLOSURES TO CONTAINERS

[75] Inventors: Glenn R. Mohr, Linthicum, Md.; Donald J. Roth, Westport, Conn.

[73] Assignee: Continental Can Company, Inc., Norwalk, Conn.

[21] Appl. No.: 74

[22] Filed: Jan. 2, 1987

[51] Int. Cl.$^4$ .............................................. H05B 6/40
[52] U.S. Cl. ............................... 219/10.79; 219/10.57; 219/10.53; 219/10.43; 156/274.2; 156/380.2
[58] Field of Search .............. 219/10.79, 10.57, 10.53, 219/10.43, 10.67, 10.75, 10.49 R, 10.61 R; 336/219, 217, 216; 156/274.2, 272.4, 380.2, 379.6, 379.7

[56] References Cited

U.S. PATENT DOCUMENTS

| | | | |
|---|---|---|---|
| 3,121,780 | 2/1964 | Mucha et al. | 219/10.79 |
| 3,303,314 | 2/1967 | Kuhlbars | 219/10.79 X |
| 3,562,030 | 2/1971 | Seulen et al. | 219/10.73 X |
| 3,651,299 | 3/1972 | O'Neill | 219/10.53 |
| 3,659,069 | 4/1972 | Balzer et al. | 219/10.79 |
| 3,738,892 | 6/1973 | Curcio | 219/10.53 X |
| 3,775,722 | 11/1973 | Wentz | 336/217 X |
| 3,800,115 | 3/1974 | Cachat | 219/10.43 |
| 4,549,057 | 10/1985 | Anderson | 219/10.43 |
| 4,590,347 | 5/1986 | Thatcher et al. | 336/219 X |

*Primary Examiner*—Philip H. Leung
*Attorney, Agent, or Firm*—Charles E. Brown

[57] ABSTRACT

This relates to an induction heating coil unit which includes a conventional one turn induction coil which has associated therewith a laminated core. The core is formed of electrically conductive metal members and insulating, preferably plastic, members. The core members are arranged in stacked relation over the coil and then the core is normally potted in a supporting structure preferably of a plastic material. Where maximum heat is required, the concentration of the conductive members is increased. By varying the ratio of the conductive members to the insulating spacer members, the desired electrical energy may be induced into a closure having an intermediate metal barrier layer so as to control the heating of the closure and thus the heat bonding of the closure to an associated container.

8 Claims, 1 Drawing Sheet

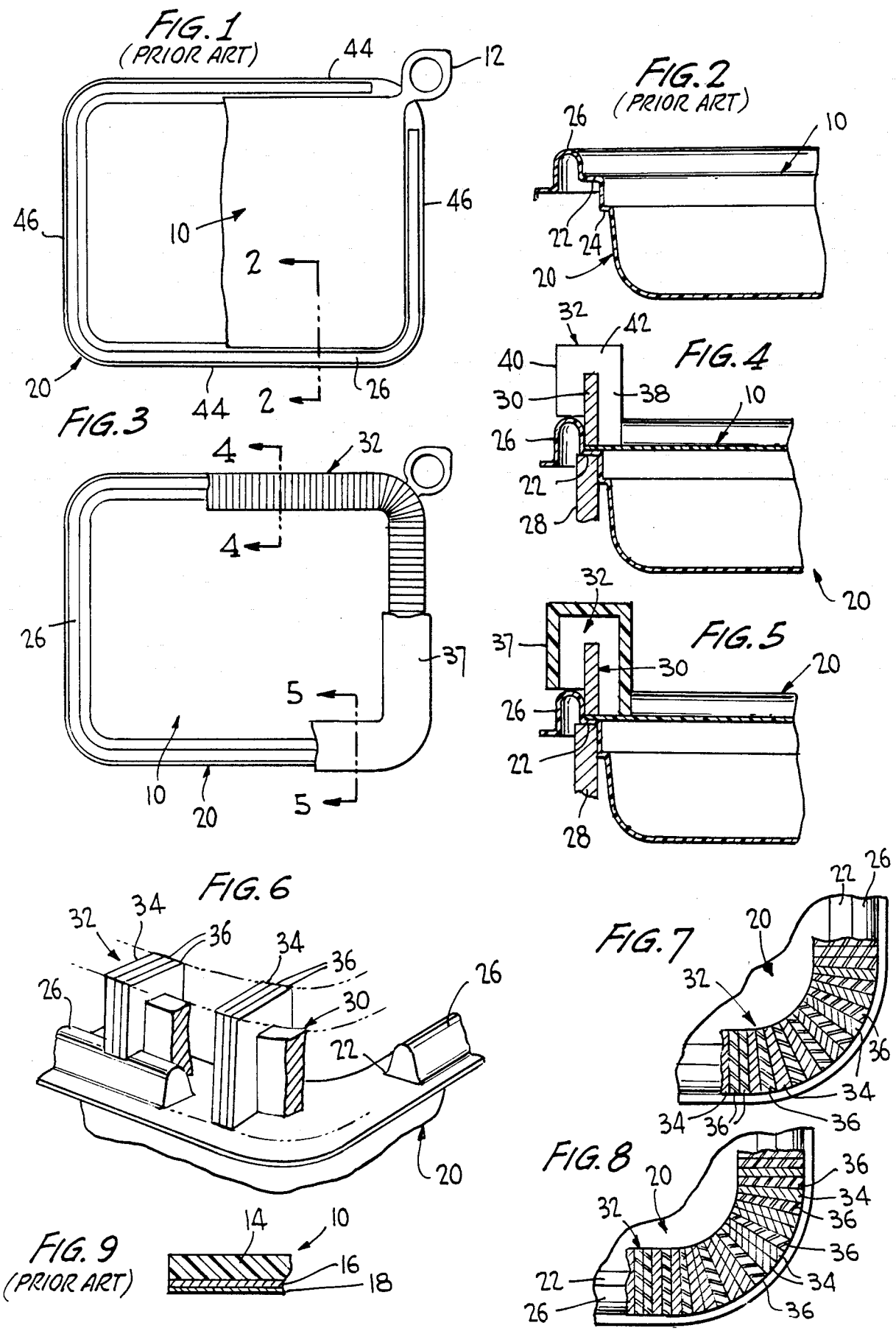

INDUCTION COIL HEATING UNIT FOR HEAT SEALING CLOSURES TO CONTAINERS

This invention relates in general to new and useful inprovements in induction heating coil units, and more particularly to a coil which is particularly adapted for the induction heating of a metal foil layer of a closure for a container wherein the closure and the container have opposed plastic layers to be heat bonded together.

In the bonding of a closure to a container wherein the outline of the bond is circular, no heating differential is involved. However, if the closure is provided with a projection, such as a pull tab, or the closure has an outline including a corner, the heat requirement, and thus the induced electrical energy requirement becomes different in these areas.

When the closure is provided with a projection, such as a pull tap, inasmuch as that projection is formed from the same laminated material as the remainder of the closure, the projecting pull tab is provided with a metal foil intermediate layer which absorbs heat. Therefore, in the area of the projecting pull tab, more electrical energy and thus heat must be introduced into the closure than around other portions of the periphery of the closure.

In a like manner, when the closure has a corner, there is a change in current distribution with the result that more electrical energy and heat is required at the corner of the closure.

In the past, closures have been heat bonded to containers utilizing an induction heating coil. This heating coil has been a one turn coil and the induced electrical energy has been controlled utilizing several elements. For example, there has been mounted within the heating coil a relatively thick plate conforming almost to the configuration of the interior of the outline of the coil. In addition, there has been associated with the coil ferrite with the amount and configuration of the ferrite being different along various portions of the circumferential extent of the heating coil.

While such an induction heating coil unit has functioned satisfactorily, it is more difficult to make and more costly to operate than desired.

It has now been found that by generally encasing the one turn coil in a core which is formed of a plurality of laminations of which certain of the laminations are spacers, and by varying the ratio of conductive laminates to non-conductive spacers, proper control of the electrical energy induced into the metal foil layer of the closure may be readily controlled and both the normally utilized center plate and the time consuming formation of the ferrite components may be eliminated.

With the above and other objects in view that will hereinafter appear, the nature of the invention will be more clearly understood by reference to the following detailed description, the appended claims, and the several views illustrated in the accompanying drawing.

FIG. 1 is a plan view of a prior art container and closure combination with a portion of the closure being broken away.

FIG. 2 is an enlarged fragmentary vertical sectional view taken generally along the line 2—2 of FIG. 1 and shows the general cross sectional configuration of the container and the relationship of the closure with respect thereto.

FIG. 3 is a plan view of the container and closure combination of FIG. 1 having in overlying relation thereto the induction heating coil unit which is the subject of this invention, portions of the coil unit being broken away.

FIG. 4 is an enlarged fragmentary transverse vertical sectional view showing the container supported for closing and the coil unit in position.

FIG. 5 is a vertical sectional view similar to FIG. 4, but taken along the line 5—5 of FIG. 3 and shows the laminated core of the coil unit encased in a suitable support.

FIG. 6 is a perspective view with parts broken away of a corner of the container and shows the relationship of the coil unit with respect to the container, the closure being omitted for purposes of clarity.

FIG. 7 is a schematic plan view of the coil unit showing the arrangement of the laminates at a typical corner.

FIG. 8 is a schematic plan view similar to FIG. 7 with the core in section showing a different ratio of the conductive laminates to the spacers when the coil unit is intended for heating a closure having at the corner a projection, such as a pull tab.

FIG. 9 is a prior art showing of the cross section of the closure incorporating a metal foil barrier layer.

This invention relates to an induction heating coil unit for heat bonding a known closure to a known container. Reference is first made to the closure, which is generally identified by the numeral 10 and is provided with a pull tab 12. As is best shown in FIG. 9, the closure 10, including the pull tab, is of a laminated construction including an outer structural layer 14 of a plastic material, an intermediate barrier layer 16 formed of a metal foil, preferably aluminum, and an inner bonding layer 18 which is also formed of a plastic material. Normally the barrier layer 16, because it is formed of metal, is bonded to the layers 14 and 18 by adhesive (not shown).

In a typical cover construction, the layers 14 and 18 will be formed of polypropylene with the layer 14 having a thickness on the order of 22 mils while the layer 18 will have a thickness on the order of 1 mil. The aluminum foil layer 16 will have a thickness on the order of 0.0018 inch.

The illustrated container, which is identified by the numeral 20 is of a rectangular outline and is molded from a laminated sheet. The container, which is not the subject of this application, is of a cross section which includes a peripheral support flange 22. Inwardly of and below the support flange 22, the container 20 may also include a rigidifying flange 24. Outwardly of the support flange 22, the container 20 includes an upstanding bead 26 which has a shock absorbing function when the container is dropped on an edge but also serves the dual function of generally centering the closure 10 on the support flange 22.

It is to be noted from the drawing that the bead 26 extends around all of the corners of the container 20 with the exception of that corner at which there is positioned the pull tab 12.

In use, the container 20 has the support flange 22 thereof seated on an upper surface of a nest member 28 in which the container 20 is received. Then with the closure 10 in place, the closure 10 has that portion thereof which overlies the support flange 22 engaged by the underside of a one turn induction heating coil 30 which functions to clamp the closure 10 tightly against the container 20. The one turn induction heating coil 30 is normally formed of copper or a copper alloy and may have a coolant passage (not shown) therein.

In accordance with this invention, the coil 30 is encased in a laminated core generally identified by the numeral 32. The laminated core 32 is formed of a plurality of thin electrically conductive members 34 which are separated by non-conductive spacers 36. The members of laminates 34 are preferably formed of sheet aluminum or steel and will have a thickness generally on the order of 1/32 inch although the thickness may be varied. The non-conductive members or laminates 36 are preferably stamped from a plastic sheet and will have a like thickness.

After the core 32 has been assembled on the coil 30, it may be, in turn, encased in a suitable housing of non-conductive material, plastic material, 37. This is best shown in FIGS. 3 and 5.

At this time it is pointed out that the members 34, 36 are of a generally inverted U-shaped configuration. Each of the members 34, 36 will include a long inner leg 38 and a shorter outer leg 40. The legs 38, 40 are connected together by a top portion 42. It is to be noted that the leg 40 is shortened so as to clear the bead 26 of the container. It is also to be understood that the leg 38 may be slightly shorter than the coil 30 so as to clear the closure 10.

The construction of the core 32 is most beneficial in that the electrical energy induced by the coil 30 into the metal barrier layer 16 of the closure 10 may be varied by merely varying the ratio of the number of the members 34 to the number of the members 36.

As is obvious from FIG. 1, the container 20 has four corners with the pull tab 12 being positioned at one of those corners. The corners join together sides 44 and ends 46 which are straight.

Because the current flow from the coil 30 is direct and substantially free of stray currents, minimum core control along the sides and ends of the container is required. Thus, for example, the ratio of members 34 to the number of the members 36 may be on the order of one to four or as low as one to six. On the other hand, as is shown in FIG. 7, in the area of a typical corner where there is stray current flow across the corner, the ratio may be increased to on the order of one to one in the center of the corner and one to two at the ends of the corner.

Further, with respect to the corner which will receive the pull tab 12, the ratio may be increased to as high as two to one again tapering off at the ends of the corner.

It is also pointed out here that with respect to the schematic illustration of FIGS. 7 and 8, although the members 34, 36 have been illustrated as being of a tapered configuration, in actuality, because of the thinness of the members and because air gaps will be permitted, the members will be of uniform thickness.

Finally, it is pointed out that at the corner at which the pull tab 12 is to be positioned, the bead 26 is terminated or interrupted. Thus in this area the outer legs of the members 34, 36 may be the same length as the inner legs as is clearly shown in FIG. 6.

Although we have specifically disclosed that the effect of the laminated core on the current induced by the various portions of the coil may be varied by utilizing insulated spacers, it is to be understood that the same general effect could be obtained by cutting back on the length of either leg or both of the conductive members to increase the air gap in the field. In fact, it is feasible to eliminate the spacer members in their entirety and vary the effective sizes of the conductive members.

Although only a preferred embodiment of the induction heating coil unit has been specifically illustrated and described herein, it is to be understood that minor variations may be made in the induction heating coil unit without departing from the spirit and scope of the invention as defined by the appended claims.

I claim:

1. An induction heating coil unit comprising a one turn coil and a laminated core generally encasing said coil, said coil and said core having matching outlines, said laminated core being of an inverted generally U-shaped cross section, and said core overlying said coil leaving a bottom of said coil exposed for direct contact with a workpiece, said exposed coil bottom forming workpiece clamping means for clamping a workpiece against an underlying support.

2. An induction heating coil unit according to claim 1 wherein said laminated core is formed of electrically conductive members and spacer members formed of electrically insulative material disposed generally in alternating relation.

3. An induction heating coil unit according to claim 2 wherein said coil unit is of a configuration including sides coupled by a rounded corner for heating a workpiece area of a like configuration wherein greater heat producing electrical energy is required at said corner than at said sides and the ratio of the number of said electrically conductive members to the number of said spacer members being greater at said corner than along said sides.

4. An induction heating coil unit according to claim 1 wherein said laminated core is formed of a plurality of conductive members, each of said conductive members being of an inverted generally U-shaped cross section including spaced legs, the length of one of said legs remaining constant, and the length of the other of said legs varying among said conductive members to vary the heating effect in different portions of said heating coil unit.

5. An induction heating coil unit comprising a one turn coil and a laminated core generally encasing said coil, said coil and said core having matching outlines, said laminated core being formed of electrically conductive members and spacer members formed of electrically insulative material disposed generally in alternating relation, said coil unit being of a configuration including sides coupled by rounded corners for heating a workpiece area of a like configuration wherein greater heat producing electrical energy is required at said corners than at said sides and the ratio of the number of said electrically conductive members to the number of said spacer members being greater at said corners than along said sides.

6. An induction heating coil unit according to claim 5 wherein said coil unit is particularly intended for heating a workpiece having an outwardly directed projection intended to be positioned at one of said corners, and said ratio being the greatest at said one corner.

7. An induction heating coil unit comprising a one turn coil and a laminated core generally encasing said coil, said coil and said core having matching outlines, said laminated core being formed of electrically conductive members and spacer members formed of electrically insulative material disposed generally in alternating relation, said coil unit being particularly intended for heating a workpiece having an outwardly directed projection, and the ratio of the number of electrically conductive members being greater in that portion of said heating coil unit intended to be aligned with such projection than in adjacent portions of said heating coil unit.

8. An induction heating unit for heat bonding a closure to a container in a seal having at least one rounded corner with the closure having a projecting pull tab at the rounded corner, said induction heating unit comprising a container support having an outline generally corresponding to the outline of the intended seal between the closure and the container; and an induction heating coil unit overlying said support and including a single turn coil having an outline matching the outline of said support and being positionable relative to said support to form clamping means for clamping a closure overlying a container seated on said support to the container, and a core of an inverted generally U-shape encasing said coil throughout the length of said coil, said core being of a laminated construction and including a plurality of inverted U-shaped members, said U-shaped members including ferrite members and insulating members arranged in generally alternating relation, each of said U-shaped members having depending inner and outer legs, all of said inner legs being of the same length and outer legs of said U-shaped members located at said corner being longer than outer legs of others of said U-shaped members.

* * * * *